US009539510B2

(12) United States Patent
Garden et al.

(10) Patent No.: US 9,539,510 B2
(45) Date of Patent: Jan. 10, 2017

(54) RESHAPABLE CONNECTOR WITH VARIABLE RIGIDITY

(75) Inventors: Alexander Garden, Bellevue, WA (US); Erik Tidemand, Seattle, WA (US); Clayton Chang, Redmond, WA (US); Muneeb Karim, Redmond, WA (US); Kent Huntsman, Bethell, WA (US); Edward C. Owen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 12/771,057

(22) Filed: Apr. 30, 2010

(65) Prior Publication Data

US 2011/0267259 A1    Nov. 3, 2011

(51) Int. Cl.
*G09G 5/00* (2006.01)
*A63F 13/42* (2014.01)
*A63F 13/213* (2014.01)
*A63F 13/98* (2014.01)
*G06F 3/01* (2006.01)

(52) U.S. Cl.
CPC ............. *A63F 13/42* (2014.09); *A63F 13/213* (2014.09); *A63F 13/98* (2014.09); *G06F 3/017* (2013.01); *A63F 2300/1093* (2013.01); *A63F 2300/6045* (2013.01); *A63F 2300/8011* (2013.01)

(58) Field of Classification Search
CPC .. G06F 3/017; A63F 13/06; A63F 2300/1093; A63F 2300/6045; A63F 2300/8011
USPC ...................... 345/156; 463/30, 47
See application file for complete search history.

(56) References Cited

U.S. PATENT DOCUMENTS

| 6,256,033 B1 | 7/2001 | Nguyen |
| 6,539,931 B2 | 4/2003 | Trajkovic et al. |
| 6,950,534 B2 | 9/2005 | Cohen et al. |
| 7,227,526 B2 | 6/2007 | Hildreth et al. |
| 7,308,112 B2 | 12/2007 | Fujimura et al. |
| 7,317,836 B2 | 1/2008 | Fujimura et al. |
| 7,590,262 B2 | 9/2009 | Fujimura et al. |
| 2002/0151337 A1* | 10/2002 | Yamashita et al. ............... 463/8 |

(Continued)

FOREIGN PATENT DOCUMENTS

CN           101510121          8/2009

OTHER PUBLICATIONS

Pölönen, "Near-to-Eye Display—An Accessory for Handheld Multimedia Devices: Subjective Studies", Journal of Display Technology, Sep. 2009, pp. 358-367, vol. 5, No. 9.

(Continued)

*Primary Examiner* — Mark Regn
(74) *Attorney, Agent, or Firm* — Gregg Wisdom; Judy Yee; Micky Minhas (57) ABSTRACT

An accessory is disclosed for use in a human-computer interface gaming or other application. The accessory can be held or otherwise interacted with by a user, where the accessory is sensed and displayed as a virtual object on a display. The virtual representation of the accessory may be an accurate recreation of the accessory, or it may be displayed as a virtual object appropriate to the gaming or other application. The real world accessory is flexible and may be morphed into a variety of forms to better suit a wide array of uses. This accessory may also serve as a platform upon which other accessories can be mounted to enhance user experience.

14 Claims, 8 Drawing Sheets

(56) References Cited

U.S. PATENT DOCUMENTS

| | | | |
|---|---|---|---|
| 2005/0026685 A1 | 2/2005 | Ruark et al. | |
| 2007/0117625 A1* | 5/2007 | Marks et al. | 463/30 |
| 2008/0070686 A1* | 3/2008 | Satsukawa et al. | 463/37 |
| 2008/0113740 A1 | 5/2008 | McGahn et al. | |
| 2008/0152191 A1 | 6/2008 | Fujimura et al. | |
| 2008/0171596 A1* | 7/2008 | Hsu | 463/39 |
| 2009/0027337 A1* | 1/2009 | Hildreth | 345/158 |
| 2009/0088248 A1 | 4/2009 | Stevens et al. | |
| 2009/0141933 A1 | 6/2009 | Wagg | |
| 2009/0158220 A1* | 6/2009 | Zalewski et al. | 715/863 |
| 2009/0167934 A1 | 7/2009 | Gupta | |
| 2009/0201248 A1 | 8/2009 | Negulescu et al. | |
| 2009/0258697 A1 | 10/2009 | Kelly et al. | |
| 2010/0179689 A1* | 7/2010 | Lin | 700/250 |

OTHER PUBLICATIONS

Toyama, et al., "Probabilistic Tracking in a Metric Space," Eighth International Conference on Computer Vision, Vancouver, Canada, vol. 2, Jul. 2001, 8 pages.

First Office Action dated Aug. 5, 2013 in Chinese Patent Application No. 201110117344.7.

English language translation and Summary of First Office Action dated Aug. 5, 2013 in Chinese Patent Application No. 201110117344.7.

Response to First Office Action filed Dec. 17, 2013 in Chinese Patent Application No. 201110117344.7.

English language Summary of, and English translation of claims as amended in, Response to First Office Action filed Dec. 17, 2013 in Chinese Patent Application No. 201110117344.7.

"Second Office Action and Search Report Received for Chinese Application No. 201110117344.7", with partial English language translation, Mailed Date: Sep. 30, 2014, 16 Pages.

"Second Office Action and Search Report Recieved for Chinese Application No. 201110117344.7", with partial English language translation, Mailed Date: Apr. 11, 2014, 20 Pages.

Response to Office Action filed Jun. 16, 2014, with English language summary and English translation of claims as amended, for Chinese Application No. 201110117344.7.

Response to Office Action filed Dec. 10, 2014, with English language summary, for Chinese Application No. 2011101173441.

"Fourth Office Action Issued in Chinese Patent Application No. 201110117344.7", Mailed Date: Mar. 31, 2015, 12 Pages.

Response to Fourth Office Action filed Jun. 5, 2015, and partial English translation, in Chinese Patent Application No. 201110117344.7.

Supplemental Response to Fourth Office Action filed Jun. 18, 2015, English translation of claims as amended, in Chinese Patent Application No. 201110117344.7.

Notice of Allowance dated Jul. 2, 2015, and partial English translation, in Chinese Patent Application No. 201110117344.7.

* cited by examiner

RESHAPABLE CONNECTOR WITH VARIABLE RIGIDITY

BACKGROUND

In the past, computing applications such as computer games and multimedia applications used controls to allow users to manipulate game characters or other aspects of an application. Typically such controls are input using, for example, controllers, remotes, keyboards, mice, or the like. More recently, computer games and multimedia applications have begun employing cameras and software gesture recognition engines to provide a human computer interface ("HCI"). With HCI, user gestures are detected, interpreted and used to control game characters or other aspects of an application.

In conventional gaming and multimedia applications, users often hold or otherwise interact with an in-game prop, such as for example a racquet, sword, stick, etc. However, these virtual props may have no corresponding real world object, which can often lead a user to feel disconnected from a gaming experience. Additionally, when the in-game prop is itself used to interact with other in-game props, such as an onscreen bat hitting an onscreen ball, having no real world counterpart can make that action more difficult for a user to coordinate.

SUMMARY

The present technology in general relates to improving a user experience in a human-computer interface for a gaming or other application. The user experience is improved by providing an accessory which may be held in a user's hand or otherwise engaged by the user. The accessory is sensed and displayed as a virtual object on a display, either as an accurate recreation of the accessory, or it may be displayed as a virtual object appropriate to the gaming or other application. The accessory may be formed into a variety of shapes so as to be customizable for a given gaming or other application. In embodiments, the accessory may further serve as a platform upon which other add-on accessories can be mounted to enhance user experience.

Embodiments of the present system relate to a human-computer interface system, including: a) a capture device for capturing a depth image within a field of view of the capture device; b) a computing environment coupled to the capture device for running an application and for processing information received from the depth camera; and c) an accessory within the field of view of the camera, the accessory formable into different shapes for use in interacting with the application running on the computing environment, and the accessory not emitting an active signal.

Further embodiments of the present system relate to a human-computer interface system, including: a) a capture device for capturing a depth image within a field of view of the capture device; b) an accessory within the field of view of the camera, the accessory formable into different shapes; and c) a computing environment coupled to the capture device for running an application and for processing information received from the depth camera, the computing environment identifying the accessory based in part on a shape of the accessory and the application running on the computing environment, the computing environment generating a virtual onscreen image of the accessory.

Still further embodiments relate to a method of interacting with a gaming application, including a) receiving a first set of data from the depth camera; b) processing the first set of data to identify a body; c) receiving a second set of data from the depth camera; and d) processing the second set of data to identify an accessory with which the body is interacting in three-dimensional space, the accessory formed into a shape specifically for the gaming application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Embodiments of the present technology will now be described with reference to FIGS. 1-12, which in general relate to an accessory which can be held or otherwise interacted with by a user, where the accessory is sensed and displayed as a virtual object on a display. The virtual representation of the accessory may be an accurate recreation of the accessory, or it may be displayed as a virtual object appropriate to the gaming or other application. The real world accessory is flexible and may be morphed into a variety of forms to better suit a wide array of uses. This accessory may also serve as a platform upon which other accessories can be mounted to enhance user experience.

Figure 1:
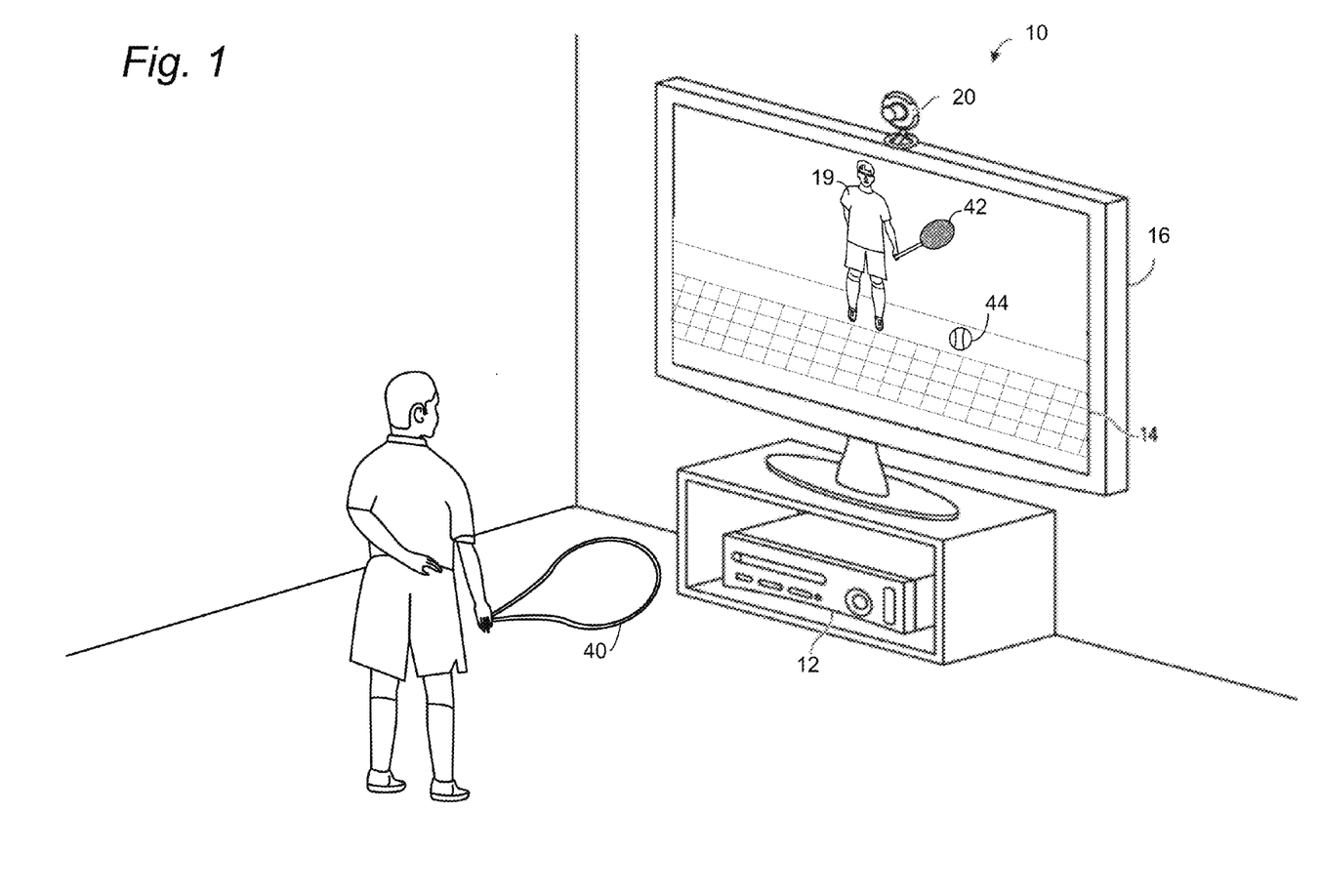
FIG. 1 illustrates an example embodiment of a target recognition, analysis, and tracking system with a user playing a game.
Figure 2:
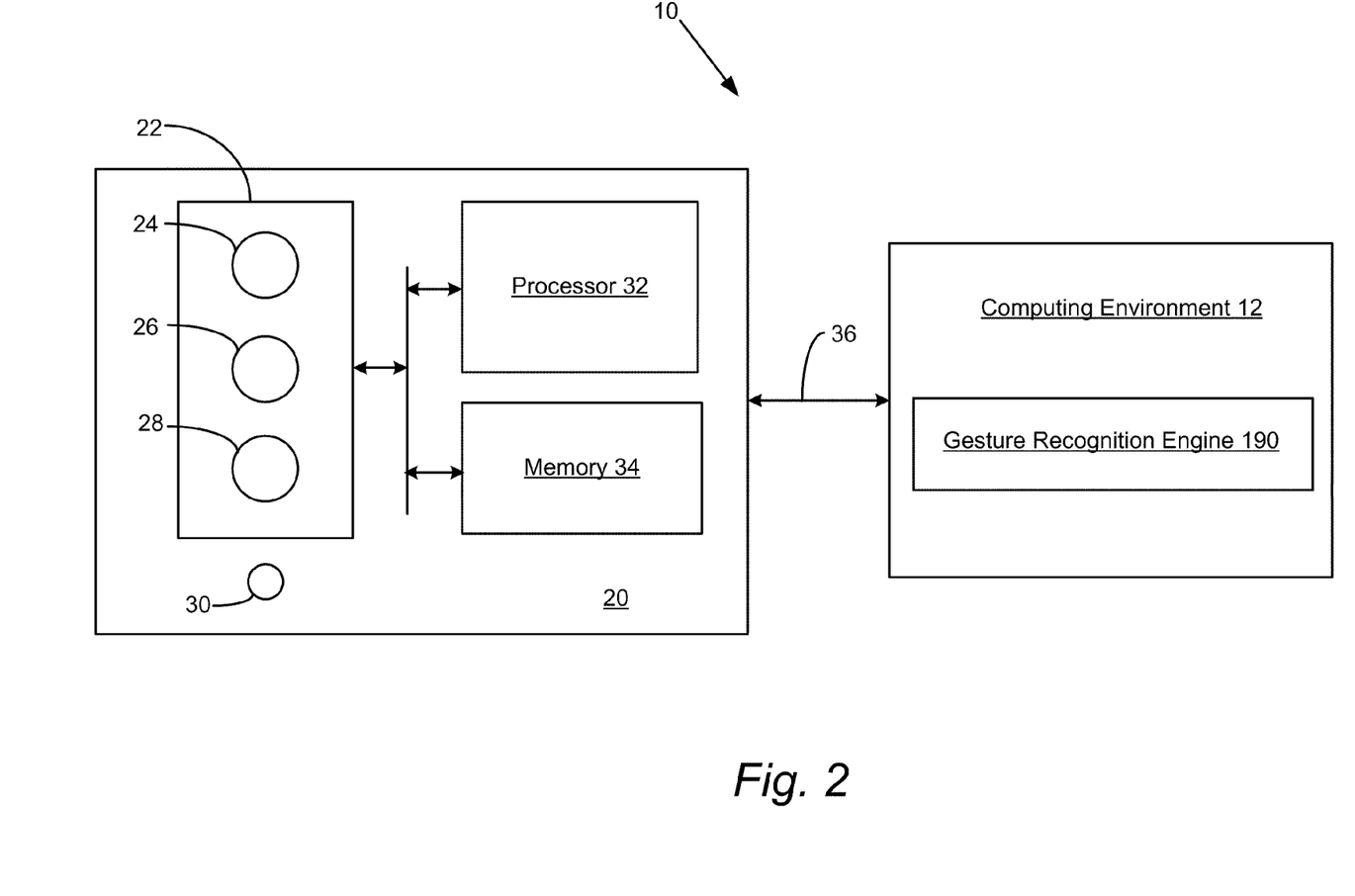
FIG. 2 illustrates an example embodiment of a capture device that may be used in a target recognition, analysis, and tracking system.

Referring initially to FIGS. 1-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, and an audiovisual device 16 having a display 14 for providing audio and visual representations from the gaming or other application. The system 10 further includes a capture device 20 for capturing positions and movements performed by the user, which the computing environment receives, interprets and uses to control the gaming or other application. The capture device also captures other objects in the field of view, such as for example accessory 40. Each of these components is explained in greater detail below.

As shown in FIG. 1, in an example embodiment, the application executing on the computing environment 12 may be a tennis game that the user 18 may be playing. The computing environment 12 may also use the audiovisual device 16 to generate a visual representation of a player avatar 21 that mimics the movements of user 18. In the illustrative embodiment shown, the user has shaped the accessory 40 roughly into the shape of a racquet by methods explained below. The accessory 40 is sensed by the capture device 20. In embodiments, the accessory may be rendered on the display 14 in an accurate reproduction of the accessory. However, as the application running on computing environment 12 is a tennis game, the application was able to detect that the accessory 40 was shaped generally into a racquet, and accordingly, the application displays the avatar 21 holding a tennis racquet 42. Movement of the accessory 40 results in a corresponding movement of the virtual racquet 42. The user may manipulate the accessory 40 in such a way so as to cause the onscreen virtual representation to interact with other onscreen virtual objects. Thus, a user may swing the accessory 40 in such a way to cause the virtual racquet 42 to hit the virtual ball 44.

It is understood that the embodiment shown in FIG. 1 is for illustrative purposes only. Accessory 40 may be formed into a wide variety of shapes representing a wide variety of other objects which may be used in a wide variety of gaming or other applications. Some of these are set forth in more detail below.

FIG. 2 illustrates an example embodiment of the capture device 20 that may be used in the target recognition, analysis, and tracking system 10. Further details relating to a capture device for use with the present technology are set forth in copending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36.

A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person. The accessory 40 may also have properties making it particularly detectable by the capture device 20. For example, the accessory 40 may be highly reflective to infrared light, or light of other wavelengths which the capture device is sensitive to.

Image data for the skeletal model and accessory 40 may then be provided to the computing environment 12 such that the computing environment may track the skeletal model and accessory 40 and render an avatar associated with the skeletal model and a virtual representation of the accessory 40 (e.g., object 42, FIG. 1). The computing environment may further determine which controls to perform in an application executing on the computer environment based on, for example, gestures of the user that have been recognized from the skeletal model and/or movements of the accessory 40. For example, as shown, in FIG. 2, the computing environment 12 may include a gesture recognition engine 190.

The gesture recognition engine 190 is explained hereinafter, but may in general include a collection of gesture filters, each comprising information concerning a gesture that may be performed by the skeletal model and/or accessory 40 (as the user moves). The data captured by the cameras 26, 28 and device 20 in the form of the skeletal model and movements associated with it may be compared to the gesture filters in the gesture recognition engine 190 to identify when a user (as represented by the skeletal model) has performed one or more gestures. Those gestures may be associated with various controls of an application. Thus, the computing environment 12 may use the gesture recognition engine 190 to interpret movements of the skeletal model and/or accessory 40, and to control an application based on the movements.

Figure 3A:
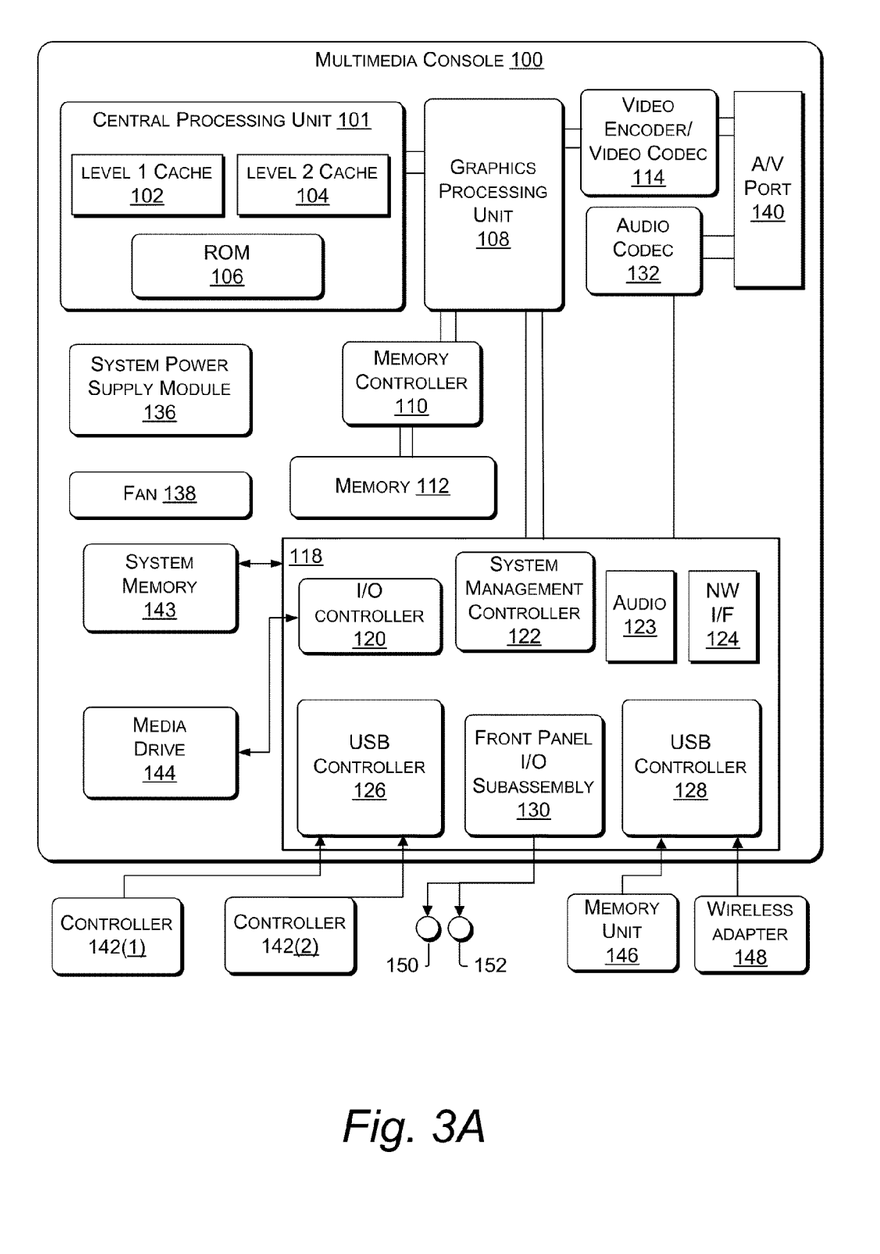
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
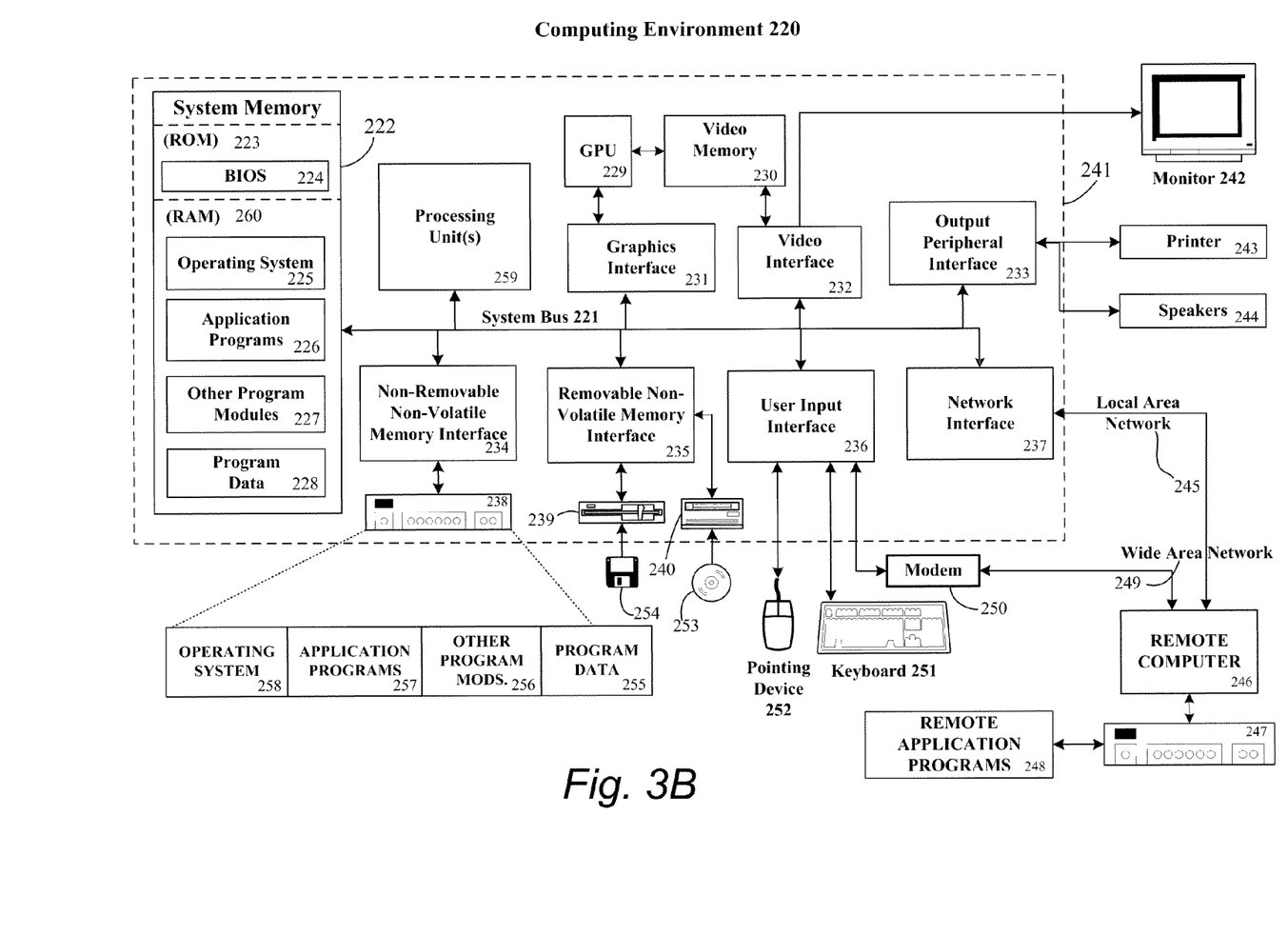
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
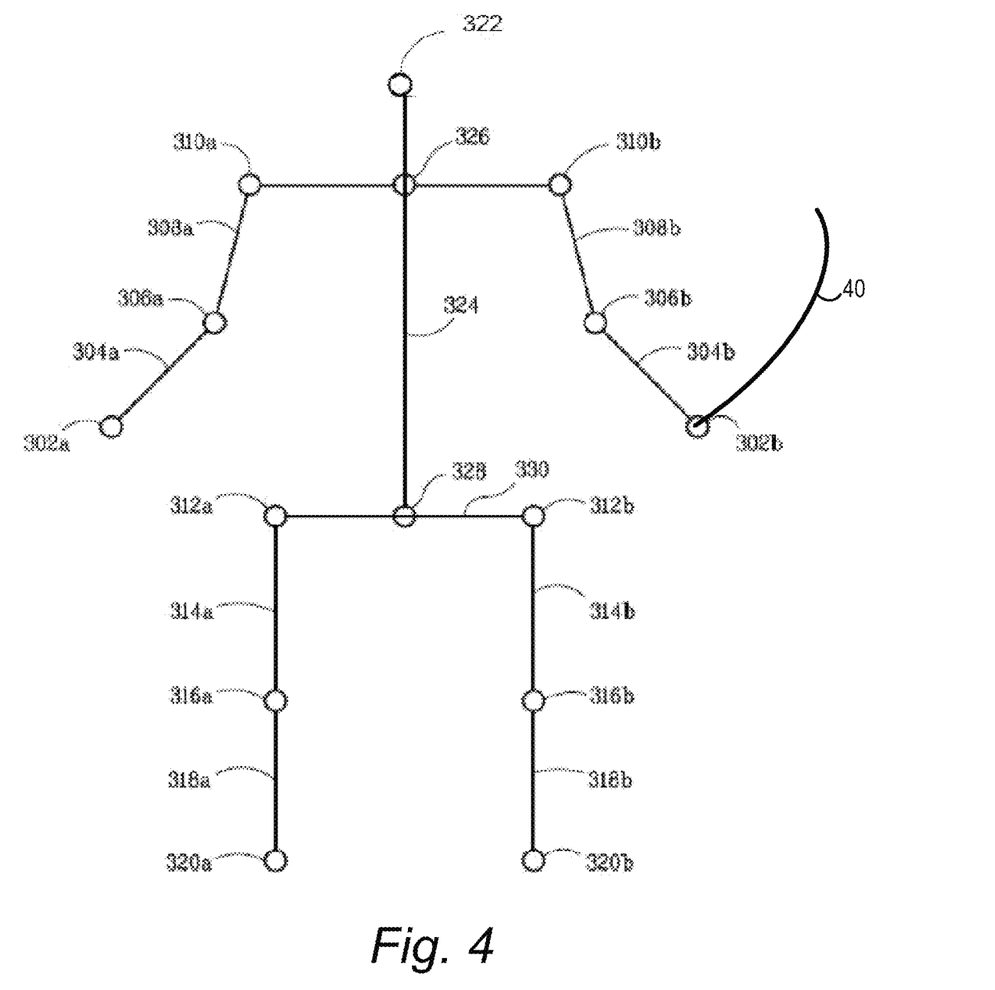
FIG. 4 illustrates a skeletal mapping of a user that has been generated from the target recognition, analysis, and tracking system of FIG. 2.

As explained in greater detail below, gesture recognition engine 190 within computing environment 12 is provided for receiving position and/or movement information and identifying gestures from this information. FIG. 4 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the mid spine 324, the top 326 and the bottom 328 of the spine, and the waist 330. Where more points are tracked, additional features may be identified, such as the bones and joints of the fingers or toes, or individual features of the face, such as the nose and eyes. Additionally, the capture device 20 maps the accessory 40, which is shown in FIG. 4 in a generalized shape and held in the left hand of the user 18.

In general, the system 10 may be viewed as working with three frames of reference. The first frame of reference is the real world 3D space in which a user moves. The second frame of reference is the 3D game space, or machine space, in which the computing environment uses pose information and kinematic equations to define the 3D positions, velocities and accelerations of the user and virtual objects created by the gaming or other application. And the third frame of reference is the 2D screen space in which the user's avatar and other objects are rendered in the display. The computing environment CPU or graphics card processor converts the 3D machine space positions, velocities and accelerations of objects to 2D screen space positions, velocities and accelerations with which the objects are displayed on the audiovisual device 16.

As discussed in the Background section, virtual onscreen props having no corresponding real world object can detract from the user experience and make it difficult to interact with other virtual onscreen objects. In accordance with the present technology, accessory 40 may be provided to improve the user experience and to facilitate user interaction with various onscreen virtual objects.

Figure 5:
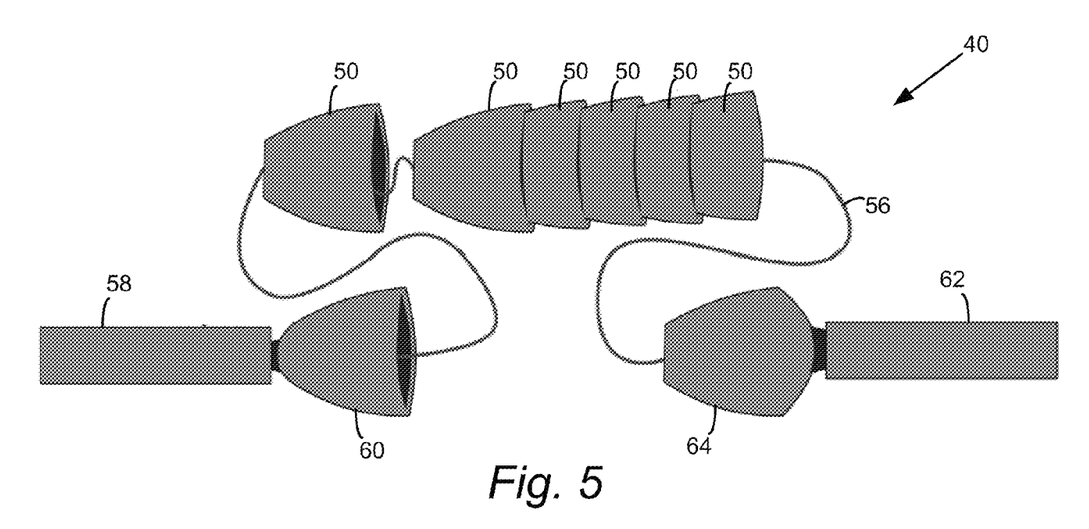
FIG. 5 is a side view of an accessory for use with embodiments of the present technology.

Referring now to FIG. 5, accessory 40 may be flexible so that it can be formed by the user into a variety of shapes. However, once formed into that shape, the accessory may be provided so as to maintain that shape, even as it undergoes accelerations as the user manipulates it. In the embodiment of FIG. 5, accessory 40 is formed of a variety of discrete shell sections 50. While six such sections 50 are shown, it is understood that accessory 40 may have more or less sections 50 so as to effectively shorten or lengthen, respectively, the accessory 40.

Figure 6:
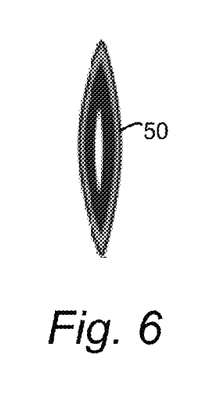
FIG. 6 is an end view of a shell section of the accessory of FIG. 5.
Figure 7:
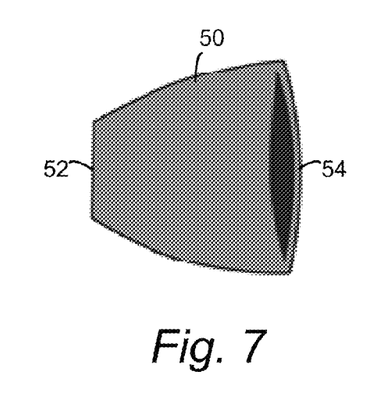
FIG. 7 is a side view of a shell section of the accessory of FIG. 5.

As shown in the front view of FIG. 6 and the side view of FIG. 7, the shell sections 50 are generally frustoconically shaped with a height being larger than its width (best seen in FIG. 6). Each shell section may be formed with a first end 52 and a second end 54 which are open so as to allow a fastening cord 56 to fit through the ends 52, 54. As seen in FIG. 5, the shell sections 50 are shaped so that the end 52 of one shell section 50 fits within the end 54 of the adjacent shell section 50. Given their shape, the shell sections fit within each other with a single degree of freedom. That is, the one shell section may rotate up or down within an adjacent shell section from the perspective of FIG. 6. The generally flat side surfaces of the shell section 50 substantially prevent side to side rotation (again from the perspective of FIG. 6) of one section within its adjacent section. The single degree of freedom allows the accessory 40 to be bent into any of a wide variety of shapes. In further embodiments, the shell sections may be other shapes, for example frustoconical with a circular cross-section, to bend with multiple degrees of freedom.

The shell sections 50 may be formed of rubber or plastic, or have a rubber or plastic coating. Thus, when the sections are tightened as explained below, the sections engage frictionally together and maintain the shape into which the accessory was bent. The sections 50 may be formed of other frictionally engaging materials in further embodiments.

Cord 56 may be formed of any of a variety of flexible materials such as metal wire, plastic or cloth rope. The cord 56 is shown slack in FIG. 5 for illustrative purposes, and in general, would not be that slack. However, when cord 56 is loosened (not to the extent shown in FIG. 5) as explained below, the shell sections fit loosely within each other so that the shape may be adjusted. Once the desired shape is provided for accessory 40, the cord 56 may be tightened to fix the accessory 40 in that position.

The accessory 40 includes end sections 58 and 62. The end section 58 includes a female portion 60 for receiving end 52 of one of the shell sections 50. End section 62 includes a male portion 64 for receiving end 54 of one of the shell sections 50. End section 58 may include a known spool assembly (not shown) within an interior mounted on bearings so as to rotate relative to female portion 60. Thus, rotation of the end section 58 in one direction may play out cord from the spool assembly to loosen cord 56 and allow adjustment of the respective shell sections 50. Rotation of the end section 58 in the opposite direction winds the cord around the spool of the spool assembly to draw in the cord, and tighten the respective sections into a fixed position with respect to each other. The spool assembly may additionally, or alternatively, be provided in end section 62 which would then be provided for rotation relative to male portion 64 to loosen and tighten the cord 56.

The spool assembly may include a known mechanism which tightens the end section 58 relative to female portion 60, frictionally or otherwise, so that rotation of the end section 58 relative to the female portion 60 is prevented or becomes difficult once the cord 56 is taut and the shell sections are fixed in position. A release mechanism or rotation of the end section to overcome the force with which rotation is prevented may again allow loosening of the cord 56 and readjustment of the shell sections 50 into a new shape.

Figures 8, 9, 10:
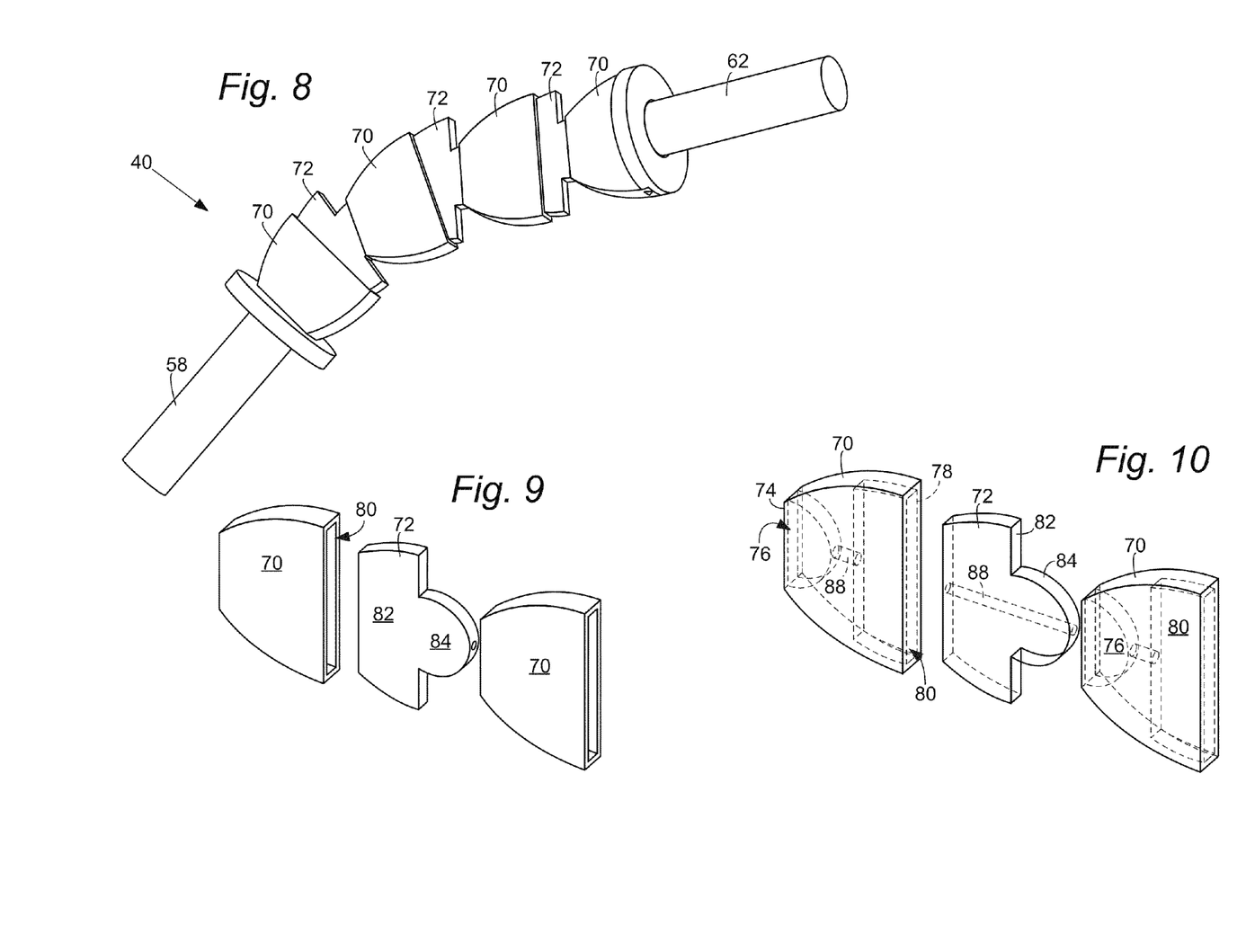
FIG. 8 is a perspective view of a further embodiment of an accessory according to the present technology.
FIG. 9 is a perspective view of the components of the accessory of FIG. 8.
FIG. 10 is a perspective view showing the interior of the components of the accessory of FIG. 8.

FIGS. 8-10 show a further embodiment of an accessory 40 according to the present technology. In the embodiment of FIGS. 8-10, the accessory 40 includes end sections 58 and 62 and chord 56 (not shown) as described above. However, in this embodiment, instead of shell sections 50 of a single shape, the accessory is formed of multiple instances of a receiving section 70 and multiple instances of a protruding section 72. The receiving sections 70 alternate with the protruding sections 72 in the assembled accessory 40. As best seen in FIGS. 9 and 10, the receiving sections 70 have a first end 74 with a semicircular recess 76, and a second end 78 with a rectangular or frustoconical recess 80. The protruding sections 72 include a substantially frustoconical section 82 and a semicircular section 84. The sections 70 and 72 may be formed of the same materials as shell sections 50 of FIGS. 5-7.

When the sections 70 and 72 are formed together, the semicircular section 84 of each protruding section 72 mates within the semicircular recess 76 of the adjacent receiving section 70. The mating is accomplished in a manner that allows rotation of the semicircular section 84 within the semicircular recess 76 with one degree of freedom. Similarly, the frustoconical section 82 of each protruding section 72 mates within the rectangular or frustoconical recess 78 of the adjacent receiving section 70. The mating is accomplished in a manner that allows rotation of the frustoconical section 82 within the rectangular or frustoconical recess 78 with one degree of freedom.

The end sections 58 and 60 may have receiving sections 70 attached thereto. The number of sections 70, 72 in the accessory 40 of this embodiment may vary. As described above with respect to FIGS. 5-7, end section 58 may include a known spool assembly (not shown) within an interior mounted on bearings so as to be able to rotate relative to sections 70, 72. Thus, rotation of the end section 58 in one direction may play out cord 56 (not shown) from the spool assembly to loosen cord 56 and allow adjustment of the respective sections 70, 72. Rotation of the end section 58 in the opposite direction winds the cord around the spool of the spool assembly to draw in the cord, and tighten the respective sections 70, 72 into a fixed position with respect to each other. As seen in FIG. 10, both sections 70 and 72 may be formed with a bore for receiving cord 56 therethrough. Given the above disclosure, those of skill in the art will appreciate further shapes and configurations for the sections which form the accessory 40.

In embodiments, the accessory 40 does not emit an active signal. The accessory 40 is sensed by depth camera 20 as described above. As used herein, reflecting light waves is not considered emitting an active signal.

The above-description provides one embodiment of how accessory 40 may be formed into a desired shape, which shape is maintained through usage of the accessory. Those of skill in the art will appreciate a wide variety of other configurations and mechanisms which may be employed to impart the same functionality to accessory 40. In one simple embodiment, the accessory may be provided with a metal core which may have a rigidity so that it may be bent using a force above a threshold which is higher than the forces that will be exerted on the accessory through normal usage. Further embodiments are contemplated. In any of the above-described embodiments, the outer surface of the accessory may be provided so as to be highly reflective of infrared light, or any of a variety of other wavelengths of light to which the capture device 20 is sensitive, to maximize the ability of the camera to detect the shape and position of the accessory 40.

In the embodiment shown in FIG. 1, the accessory is bent into the shape of a racquet, with end sections 58 and 62 substantially adjacent to each other. It will be appreciated that accessory 40 may be formed into a wide variety of other objects, which may or may not be recognizable to an application running on computing device 12. As further examples, the accessory may be formed into a bat, a hockey stick or other stick, a golf club or other club, a disk, a handle, a baton, a hook, a sword, a wand, a staff, etc. This list is not intended to be exhaustive and the accessory may be formed into other shapes in further embodiments. Moreover, while the accessory may often be held in a user's hand, it need not be in further embodiments. For example, the accessory may be formed into a ski or snow board for a user's foot. In further embodiments, the accessory may be shaped into an object which is not held in a hand or on a foot. The accessory may be worn, for example as a hat or scarf, or the accessory may be completely separate from the user's body.

Moreover, in the embodiment shown, the overall shape of the accessory 40 is generally long and narrow. However, the overall shape of accessory 40 may vary in embodiments. For example it may be a planar-shaped disk, circular or rectangular. It may further be forked, having a base with two or more extensions extending from the base. The accessory 40 may be other shapes in further embodiments.

In further embodiments, a connector (not shown) may be formed on or attached to the accessory 40, either on one or the other end section 58, 62, or somewhere in between. This connector may be used to connect add-on accessories to the accessory 40. These add-on accessories may have the same general configuration as accessory 40 described above.

Alternatively, these add-on accessories may be different than accessory 40. In embodiments, the accessory 40 and/or the add-on accessories may be customized for a particular application or group of applications. In this embodiment, the accessory may be customized beyond merely forming the accessory into a shape specific to a given gaming or other application.

Those of skill in the art will understand a variety of methods of analyzing user and/or accessory movement to determine whether the movements conform to a predefined gesture. Such methods are disclosed for example in the above incorporated application Ser. No. 12/475,308, as well as U.S. Patent Publication No. 2009/0074248, entitled "Gesture-Controlled Interfaces For Self-Service Machines And Other Applications," which publication is incorporated by reference herein in its entirety. However, in general, user/accessory positions and movements are detected by the capture device 20. This information is then passed to the gesture recognition engine 190, together. The operation of gesture recognition engine 190 is explained in greater detail with reference to the block diagram of FIG. 11 and the flowchart of FIG. 12.

Figure 11:
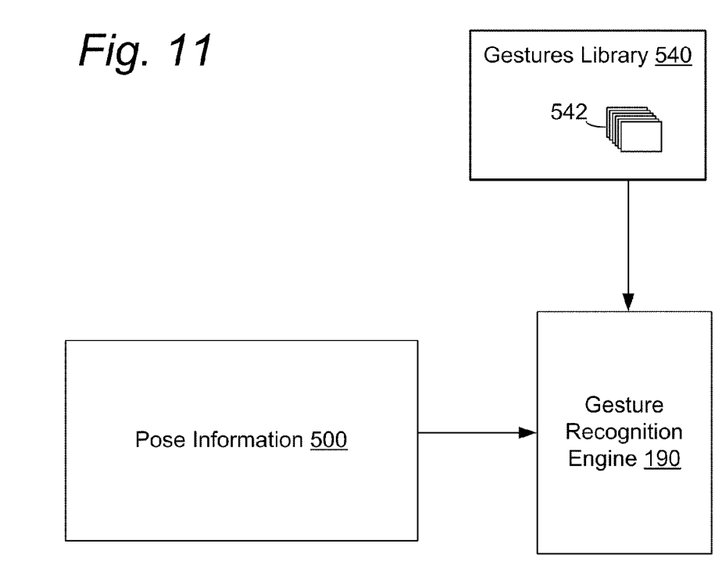
FIG. 11 is a block diagram showing a gesture recognition engine for recognizing gestures.
Figure 12:
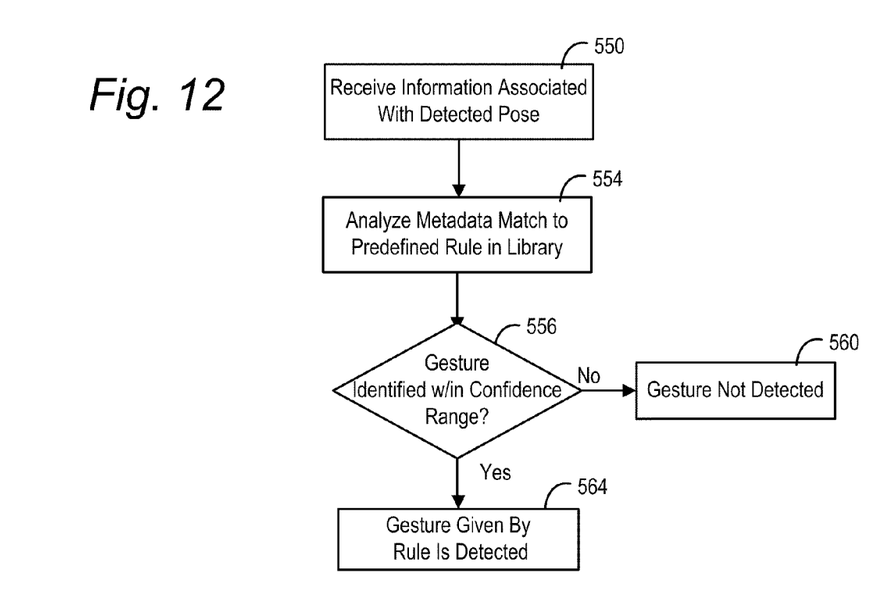
FIG. 12 is a flowchart showing the operation of the gesture recognition engine.

The gesture recognition engine 190 receives pose information 500 in step 550. The pose information may include parameters relating to the user's position and/or movement and it may include parameters relating to the accessory position and/or movement. The gesture recognition engine 190 analyzes the received pose information 500 in step 554 to see if the pose information matches any predefined rule 542 stored within a gestures library 540. A stored rule 542 describes when particular positions and/or kinetic motions indicated by the pose information 500 are to be interpreted as a predefined gesture. In embodiments, each gesture may have a different, unique rule or set of rules 542. Rules may be created by a game author, by a host of the gaming platform or by users themselves.

Each rule 542 may have a number of parameters for one or more of the body parts shown in FIG. 4. Moreover, the system 10 and application running on computing environment 12 may be able to recognize and identify that the accessory 40 is shaped to be an object known by the application. In such instances, there may be predefined gesture rules that incorporate parameters for the accessory 40.

The gesture recognition engine 190 may output both an identified gesture and a confidence level which corresponds to the likelihood that the user's position/movement corresponds to that gesture. In particular, in addition to defining the parameters required for a gesture, a rule may further include a threshold confidence level required before pose information 500 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture rule 542, the gesture recognition engine 190 then determines in step 556 whether the confidence level is above a predetermined threshold for the rule under consideration. The threshold confidence level may be stored in association with the rule under consideration. If the confidence level is below the threshold, no gesture is detected (step 560) and no action is taken. On the other hand, if the confidence level is above the threshold, the user's motion is determined to satisfy the gesture rule under consideration, and the gesture recognition engine 190 returns the identified gesture.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A human-computer interface system capable of interaction with an executing software application of a plurality of software applications, the plurality of software applications presenting a plurality of different virtual objects with which a user may interact, the human-computer interface system comprising:
    a capture device for capturing a depth image within a field of view of the capture device;
    a computing environment coupled to the capture device for running the plurality of software applications and for processing information received from the capture device; and
    an inanimate accessory formable into a plurality of different shapes of a plurality of different virtual objects within at least one of the plurality of software applications, but not being the object represented by the virtual object, and the accessory not emitting an active signal, the capture device and computing environment cooperating to relay a shape of the inanimate accessory to the application running on the computing environment, and, based on a shape of the accessory, the application recognizing which of the plurality of different virtual objects is represented by the shape into which the inanimate accessory is deformed and, in response, displaying the virtual object represented by the inanimate accessory on a display associated with the computing environment, where the virtual object is not part of a body of a virtual person displayed on the display.

2. The human-computer interface system of claim 1, wherein the accessory reflects light in the infrared spectrum.

3. The human-computer interface system of claim 1, wherein the accessory is movable between a first condition where it is in a fixed position and a second condition where the shape of the accessory is formable into different shapes.

4. The human-computer interface system of claim 1, wherein the accessory is formed of a plurality of discrete sections which fit together in variable positions.

5. The human-computer interface system of claim 4, wherein the plurality of discrete sections fit together with one degree of freedom.

6. The human-computer interface system of claim 4, wherein the plurality of discrete sections are fit together to form a shape of the accessory and then the plurality of discrete sections are tightened together into a fixed position.

7. The human-computer interface system of claim 1, wherein the accessory is customized for the application running on the computing environment.

8. The human-computer interface system of claim 1, further comprising a connector allowing add-on accessories to be affixed to the accessory.

9. The human-computer interface system of claim 8, wherein the accessory is customized for the application running on the computing environment.

10. The human-computer interface system of claim 1, wherein the the displayed virtual object represented by the inanimate accessory matches the appearance of the accessory.

11. The human-computer interface system of claim 1, wherein the accessory is usable with a hand or foot of a user, or wearable by the user.

12. The human-computer interface system of claim 1, wherein the accessory reflects light in the infrared spectrum.

13. The human-computer interface system of claim 1, wherein the accessory is formable into a position which remains fixed during use of the accessory.

14. The human-computer interface system of claim 1, further comprising a connector allowing add-on accessories to be affixed to the accessory.

* * * * *